United States Patent [19]

Schönert

[11] 4,359,193
[45] Nov. 16, 1982

[54] METHOD OF AND AN APPARATUS FOR FINELY DIVIDING INELASTIC MATERIALS

[76] Inventor: Klaus Schönert, Berlinerstr. 27a, D-75 Karlsruhe, Fed. Rep. of Germany

[21] Appl. No.: 158,467

[22] Filed: Jun. 11, 1980

Related U.S. Application Data

[63] Continuation of Ser. No. 810,750, Jun. 28, 1977, abandoned.

[30] Foreign Application Priority Data

Jun. 30, 1976 [DE] Fed. Rep. of Germany ....... 2629509

[51] Int. Cl.³ .............................................. B02C 4/08
[52] U.S. Cl. ......................................... 241/3; 241/30; 241/224; 241/236; 241/261
[58] Field of Search ................ 425/DIG. 230; 241/3, 241/14, 24, 30, 79, 236, 235, 227, 261, 22, 246, 225

[56] References Cited

U.S. PATENT DOCUMENTS

| | | | |
|---|---|---|---|
| 250,564 | 12/1881 | McGinty et al. ............... | 241/235 X |
| 690,238 | 12/1901 | Crean ............................... | 241/235 X |
| 2,533,550 | 12/1950 | Blackwell ........................ | 241/235 X |
| 2,578,540 | 12/1951 | Gundlach ........................ | 241/236 |
| 3,859,026 | 1/1975 | Osborn ................. | 425/DIG. 230 X |

*Primary Examiner*—Mark Rosenbaum
*Attorney, Agent, or Firm*—Kenyon & Kenyon

[57] ABSTRACT

A method for the fine grinding of inelastic material, in particular polymers as polytetrafluoroethylene, polyethylene, polypropylene, polyamide, organic chemicals and plastic metals, and of materials which are transferred into a state of inelastic behavior before or during grinding by application of heat and/or application and conversion of mechanical energy into heat is disclosed wherein the material to be ground is first urged by compression loading into recesses which are formed in the working face of grinding tools applying the compression loading or pressed into cavities of a bulk of grinding bodies, e.g. balls, preferably after previously mixing the material to be ground with the grinding bodies, the recesses or cavities having a size in accordance with the fineness to be obtained. During or after this procedure residual material which still connects the so formed sub-particles is destroyed by movement of the sub-particles relative to each other. The sub-particles are removed from the recesses or cavities. Apparatuses for carrying out the method are described, among which is a two-roller press the working surface of at least one of its rollers is provided with the recesses the size(s) of which correspond(s) or is related to the size(s) of the sub-particles to be obtained. If a mixture of grinding bodies and material to be ground is to be compressed by a two-roller press the size of the recesses for the formation of compacts, is a multiple of the size of the grinding bodies and the material to be ground. A ram press or a screw or worm press can be used in connection with a mixture of grinding bodies and material to be ground.

25 Claims, 25 Drawing Figures

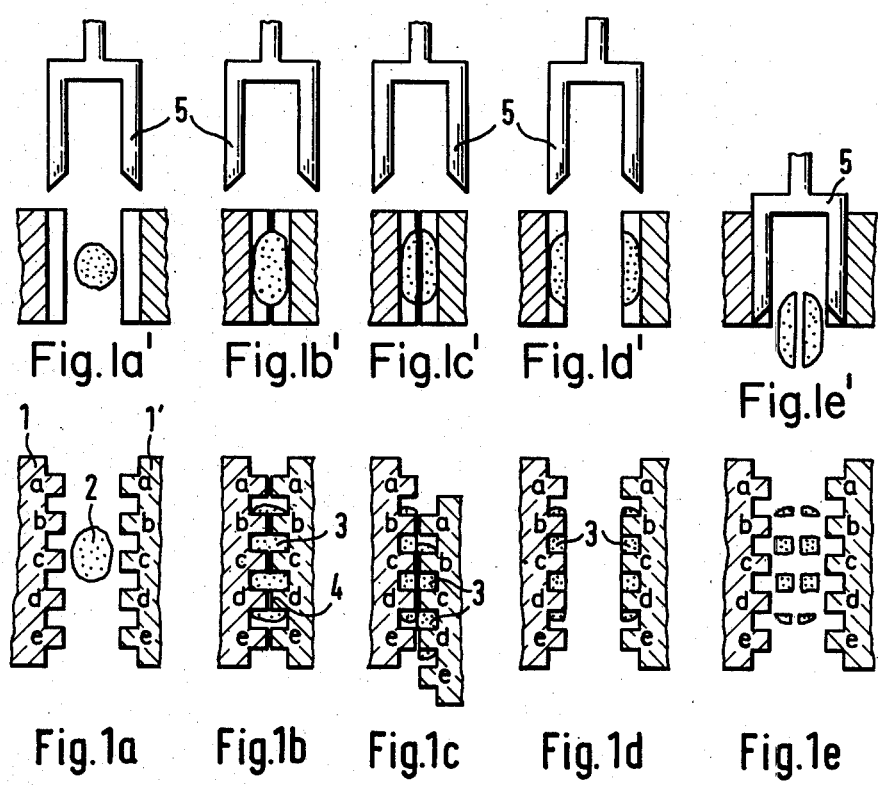

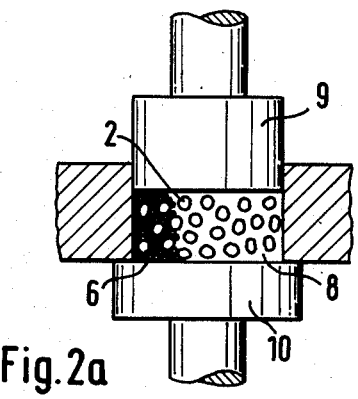
Fig. 2a
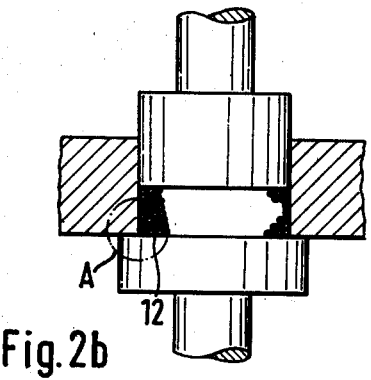
Fig. 2b
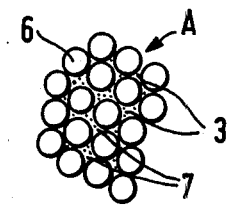
Fig. 2b'
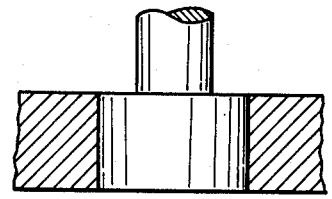
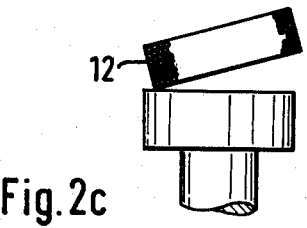
Fig. 2c

METHOD OF AND AN APPARATUS FOR FINELY DIVIDING INELASTIC MATERIALS

This is a continuation of application Ser. No. 810,750, filed June 28, 1977, now abandoned.

BACKGROUND OF THE INVENTION

Particles of many materials to be ground deform practically inelastically under heavy loads, such as compression, shear and impact stresses occurring in size reduction machinery. This applies to materials which have already a low yielding strength at normal temperature, such as many polymers, especially thermoplastic polymers (polytetrafluoroethylene, polyethylene, polypropylene, polyamide, etc.), organic chemicals, and plastic metals (e.g. copper), materials which, although behaving largely elastically at normal temperature and low stresses, heat up under stress and react increasingly inelastically, such as polystyrene, polymethylmethacrylate, materials which become plastifiable under high pressures, such as alkalihalides.

Materials are classified as inelastic if their force-deformation (stress-strain) diagram shows no coincidence of the loading and unloading curve. The first one takes a flatter course than the unload curve. The area circumscribed by both curves is a measure of the inelastic deformation. Contrary to that, the load and unload curves coincide if the material is elastic. The inelasticity appears in two forms to be differentiated: viscous flow and plastic deformation. The predominance of either of the two in the material behavior depends on the molecular structure of the substance and, with a given substance, on the temperature, and on velocity, and intensity of the loading. At increasing temperature or decreasing rate of load application the inelastic behavior intensifies.

There is a general tendency that with decreasing particle size the capability of particles to behave inelastically, in other words to deform inelastically, increases. This applies specifically to particle sizes below 1 mm. Therefore, in pulverization even particles of those materials which are normally considered as elastic or only weak inelastic materials, practically behave inelastic.

Inelastic material behavior considerably impedes the comminution of many substances, in particular tough ones. Therefore, it is difficult to grind many of the materials of the above mentioned groups in a particle size range below 1 mm.

The prior art suggested the following possibilities to overcome those difficulties:

reducing the inelasticity by subjecting the material to high deformation rates and/or cooling the material to enhance the development of brittle fractures (embrittlement of the particles), i.e. effect a predominantly elastic deformation of the bodies up to rupture, subjecting the material to pronounced shearing stress, such as can be obtained at edges and knives (cutting of the particles).

High deformation rates are achieved with impact mills of any kind and air jet mills. These may be operated at high rates of air or gas flow, a fact which facilitates cooling of the material to be ground. Impact mills therefore, are especially well suited for pulverizing inelastic materials. In cases of extreme inelasticity the embrittlement must be effected by means of liquid gas, e.g. liquid nitrogen. The grinding is done in low-temperature milling plants which may comprise mills of any kind, e.g. impact mills, disc mills, vibration mills, and the like.

A pronounced shearing stress at edges and knives is achieved with cut-mills, cutter-granulators, disc mills, and also with impact mills having profiled grinding tools. Cut-mills and cutter-granulators are particularly suitable for producing particles of a size above 1 mm, whereas disc mills and impact mills having profiled grinding tools are used for grinding material down to particle sizes of 200 $\mu$m but not less than 100 $\mu$m.

The power requirement for fine-grinding inelastic substances or substances which behave inelastically when being subjected to comminution is quite considerable and lies between 50 and 1500 kWh/t, depending on the material and desired degree of fineness. The throughput rate of any given mill is noticeably lowered when higher degrees of fineness have to be produced. With plastics, for instance, this reduction may be 80% if the maximum particle size of the finished material is to be decreased from 800 $\mu$m to 200 $\mu$m. If such degrees of fineness are desired, the throughputs of mills of ordinary capacity often are no more than 10 to 40 kg/h for very inelastic materials.

It is almost impossible to produce particles of less than 50 $\mu$m by grinding if the material is extremely inelastic, such as polyethylene, polytetrafluoroethylene, polypropylene, and copper. Powders of this degree of fineness are obtained by precipitation from solutions or by the spraying of melts.

BRIEF SUMMARY OF THE INVENTION

It is the object of the invention to provide a method of and and apparatus for fine grinding inelastic materials, more specifically for grinding such materials down to medium particle sizes, based on the volume, of from approximately 10 $\mu$m to 2 $\mu$m, especially from 10 to 500 $\mu$m, by means of which in particular the materials mentioned can be ground with less difficulty, mechanical expenditure, and power consumption and/or to finer degrees of milling at the same power consumption than heretofore possible, and without requiring any expensive cold milling.

Contrary to pulverization processes applied so far, the method devised to solve the problem specified above of fine-grinding inelastic materials of the groups of substances listed initially is not based on promoting the elastic behavior up to the development of brittle fractures, but instead on enhancing the inelastic deformability of the materials, which characteristic is utilized to divide the material by a kind of shaping or molding into smaller, largely coherent sub-particles which are then separated from one another into individual particles.

The method according to the invention which is characterized, with advantageous modifications, comprises the following essential method steps:

1. The material to be ground which may be supplied in the form of small particles, threads, plates, or films—if it does not behave inelastically per se—is tempered such that it will become sufficiently flowable, under subsequent compression loading, so as to be urged into small recesses or cavities. This tempering may be effected prior to the loading or during the same by the supply of heat and/or the mechanical work.

2. The material tempered, if necessary, which behaves inelastically is urged by mechanically effected compression into small recesses or cavities corresponding to the degree of fineness to be obtained. The recesses or cavities may be formed in the surface or working face of grinding tools or defined in a bulk grinding medium of loose bodies shaped and dimensioned according to the respective purpose. Under the mechanically effected pressure the material is pressed into the recesses or cavities so that sub-particles of the desired size or size distribution are formed. These sub-particles usually are still interconnected by residual material in the form of lamellae or webs.

3. During method step 2 or subsequently the lamella- or web-like connections between the sub-particles are destroyed by relative movement of the sub-particles which are thus isolated from one another.

After an interposed disintegration step, the subparticles and the grinding tools or grinding bodies are separated.

The use of grinding tools provided with cavities of a similar sizes distribution as the particle size distribution to be obtained, or the use of grinding bodies having a certain size distribution, such that the cavities being formed between them and being open towards the outside have a hollow volume distribution similar to the desired particle size distribution, permit the production not only of monodisperse pulverulant material but also of pulverulants having a predetermined particle size distribution.

In a two-roller press for carrying out the method the surface or working face of at least one of the rollers is provided with cavities or recesses of a size which corresponds or is similar to that of the sub-particles to be obtained. The cavities may be constituted by grooves or cams in the working surfaces of the rollers, with the cams of one roller engaging the grooves of the other one. As with gears, this establishes in the area of the gap between the rollers small cavities orientated in the circumferential and axial directions. The openings as such and particularly the ones between the cams and webs preferably taper conically outwardly so as to facilitate the ejection of the sub-particles.

Mixtures of grinding bodies and material to be ground may also be pressure-loaded by roller presses having smooth rollers or those of the kind used for pressing briquettes, with which at least one roller has recesses formed in its working surface and these recesses have a dimension for forming the compacts which are several times that taken up by the material to be ground together with the grinding bodies. Thus briquette-like compacts are made from grinding bodies and ground material. It is provided, in accordance with the invention, to effect the separation of the resulting sub-particles by driving the rollers at different numbers of revolution. In this manner relatively small particles are obtained even when using relatively large recesses.

Some particles, especially the fine particles tend to adhere to the roller surface, and particularly to the recesses formed in the rolling surface. Therefore, a modification of the roller press according to the invention includes not only the rollers but also a means for ejecting the material which was urged into the recesses. Such ejectors may be embodied by a brush, by gears engaging in the recesses and having straight or inclined tooth surfaces, or by jet nozzles for pressurized gas or liquid directed against the recesses. Other embodiments of ejectors are useful as well, such as those known from press granulators and briquette-forming rollers.

It is advantageous to provide a sufficiently high chute above the roller nip so as to permit easy drawing of granule-shaped material to be ground into the roller nip. When the grinding is effected with the aid of grinding bodies, it is useful in many cases to provide a double chute, namely an inner chute for the material to be ground and an outer chute for the grinding bodies.

Apart from roller presses screw or worm presses are suitable for the continuous fine grinding. The screw spindle may be cylindrical, particularly conical. A screw press especially well adapted to the method of the invention provides that the opposite support, this means the support against which the screw conveys the material, is resiliently mounted, for instance by means of springs or a hydropneumatic cylinder. Thereby a predetermined maximal pressure can be maintained in the volume where the compression takes place. Compacts are formed which are destroyed by meshing pin or cam rings rotated in opposite directions in the outlet gap, at least one of which is driven. The compacts may become more or less disintegrated into individual particles of the ground material and grinding bodies, depending on the difference in the number of revolutions.

For fine grinding of smaller charges a ram press may also be suitable with a press plunger and an opposed plunger, the latter being retracted from the press chamber after the end of a pressing stroke so that the resulting compact can be ejected by further advance of the plunger. This kind of press is suitable for a compression loading of a mixture of grinding bodies and material to be ground. A modification of such a per se known ram press devised for carrying out the method of the invention especially advantageously provides for at least the counter-plunger to be rotatable and equipped with shear pins projecting into the press chamber. In this manner the compacts formed can be largely disintegrated in the press chamber so that the subsequent separation of the grinding bodies from the particles formed and the detruction of the webs interconnecting the sub-particles can be taken up already in the press chamber.

BRIEF DESCRIPTION OF SEVERAL VIEWS OF THE DRAWINGS

The invention together with advantageous details is described further, by way of example, with reference to the accompanying drawings, in which:

FIGS. 1a' through 1e' are a diagramatic representation of a side view of a grinding tool with plates performing the grinding steps on an individual particle, FIGS. 1a through 1e are a top view of the steps of grinding an individual particle with the plate member of FIGS. 1a' through 1e', FIGS. 2a through 2c show three operating positions of a ram press for grinding particles collectively with grinding bodies.

DETAILED DESCRIPTION OF PREFERRED EMBODIMENTS

Figure 3A:
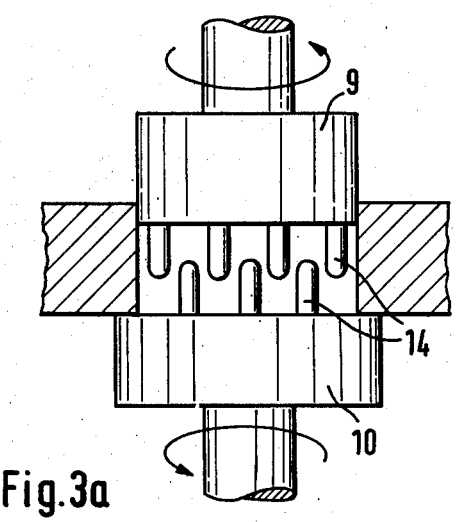
FIGS. 3a and 3b show a ram press with shear pins provided at the press plunger and at the opposed plunger in partly and completely closed position.

FIGS. 1a'-1e', and FIGS. 1a-1e show an embodiment of the inventive concept comprising frinding tools in the forms of plates 1 and 1' provided with groove-like recesses or cavities and remaining webs in different consecutive relative positions, shown in two orthogonal views, FIGS. 1a'-1e' and FIGS. 1a-1e respectively. FIGS. 1a and 1a' depict the first closing position, FIGS. 1c and 1c' depict the second closing position (after a relative displacement of the plates), FIG. 1d and 1d' show the second opening position (before ejecting the subparticles), and FIGS. 1e and 1e' depict the third opening position (after ejecting subparticles). Both plates 1 and 1' are movable against each other and parallel to each other. A particle to be ground 2 is grasped during the closing stroke, is pressed, and urged into several recesses. The resulting sub-particles 3 in the recesses are regularly interconnected by lamella-like residual material 4, the thickness of the interconnections being determined by the design. These lamellae or residue of material are broken or torn by relative movement in tangential direction. During the opening stroke or subsequently an ejector 5 ejects the subparticles 3 which are now separated out of the recesses. If the working surfaces of the grinding tools have a groove-like profile, the resulting sub-particles will be elongated. The oblong sub-particles can be transformed into cubic ones by feeding them through the grinding tool a second time, preferably oriented transversely to the recesses.

FIGS. 2a through 2c depict an embodiment which utilizes grinding balls of approximately the same size as the grinding bodies. A mixture of material particles to be ground 2 and grinding balls 6 at first is contained loosely in a press chamber 8 (FIG. 2a). The grinding balls are smaller than the particles in order to obtain a useful degree of size-reduction. The size ratio may be between 1:3 to 1:20 and depends on the required degree of size-reduction and on the deformation resistance of the material which determines the pressure to be applied at a given dimension of the grinding balls. The mixing ratio between the material to be ground and the grinding balls is so choosen that the volume of the material to be ground corresponds approximately to the void volume of the bulk of grinding balls. Operationally it may be more favorable to work with an excess of material to be ground so that no bridges of grinding balls can form in partial areas between the press plunger and the opposite plunger. The press plunger 9 compresses the mixture against the opposed plunger 10 until a rather dense packing of the balls is obtained (FIG. 2b and detail "A"). The material to be ground is urged into the cavities between the balls by the compressing action. This forms sub-particles 3 which are still interconnected by web-like residual material 7. The compressing procedure produces a kind of briquette or compact 12 which is held together essentially by the cohesion in the material to be ground but, in addition, also by forces of adhesion between the material to be ground and the grinding balls. In the extreme case a compact 12 may be formed which contains the material as the connecting matrix and the grinding balls as inclusions. After the compression the compact 12 is ejected by further advance of the press plunger 9 and retraction of the opposed plunger 10 (FIG. 2c). The compact 12 is subsequently destroyed by impact, which shatters the compact or friction, which tears, the residual material 7 and separates the balls. This tears the web-like residual material 7 between the sub-particles 3. In a subsequent separating step the grinding balls are separated from the ground material. The separation may be effected according to any one of the known separating processes.

Figure 3B:
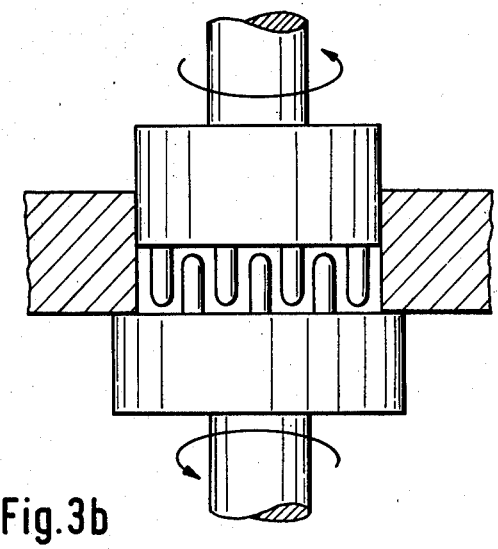

FIG. 3 shows a modified pressing apparatus in an open position (FIG. 3a) and a largely closed position (FIG. 3b). The press plunger 9 and the opposed plunger 10 are rotatable and each comprises shear pins 14. Slow rotation of the press plunger prevents the formation of bridges between the pins or between the press plunger and the opposed plunger and causes the destruction of residual material and connections between the sub-particles 3 during the compressing process already.

The densest packing of balls of the same size contains cavities of two different sizes, namely approximately 22% and approximately 42% of the ball diameter. With a fraction of balls of somewhat different size and with a packing which is not entirely regular, cavities are formed up to approximately 50% of the ball diameter d. This results in a grinding factor $z = 2x_{max}/d$ if the grinding factor is defined as the ratio between the maximum size of the particles charged $x_{max}$ and the maximum size of the sub-particles $d_{max} = 0.5$ d. Grinding balls having a diameter of 100 μm must be used to obtain a ground product having a particle size of less than 50 μm.

The method according to the invention can be realized in various apparatuses. Three possibilites will be indicated below which permit a continuous comminution.

Figure 4A:
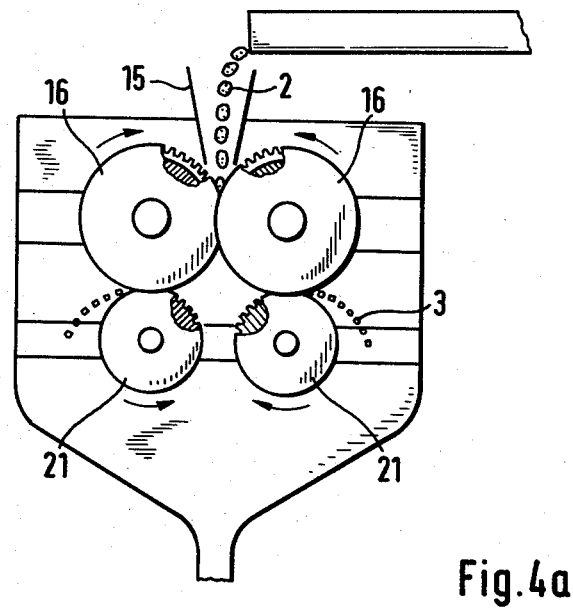
FIG. 4a is a sectional view, 4b is a front view of the press roller on an enlarged scale, with a device for ejecting the sub-particles.
Figure 4B:
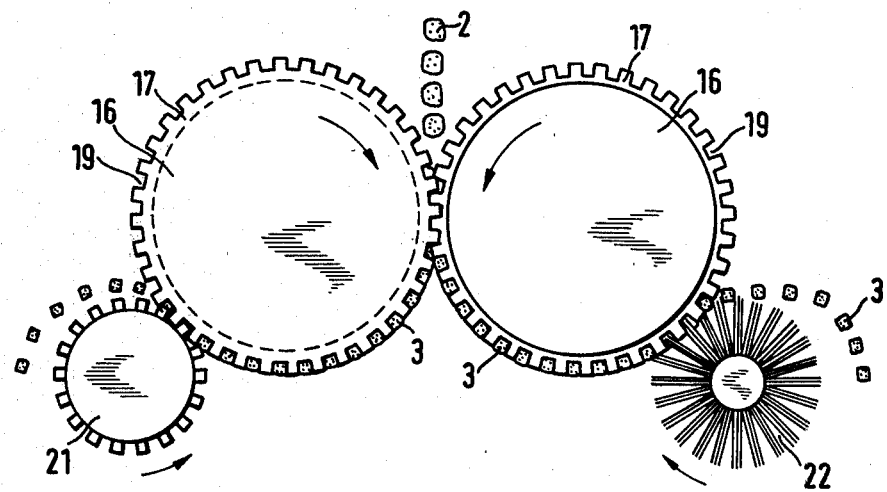
FIG. 4c is a top plan view of the press roller pair.
FIG. 4d shows an ejector in the form of jet nozzles associated with a press roller.
FIG. 4e is a part sectional view of the meshing press rollers in the area of the roller nip in vertical and parallel section, respectively, with regard to the axis.
FIG. 4f is a part sectional view of the meshing press rollers provided with conical cams, taken in the area of the roller nip, in vertical and parallel section, respectively, with regard to the axis.
FIG. 4g shows a roller pair in the area of the roller nip with meshing webs provided with holes parallel to the axis.
Figure 4C:
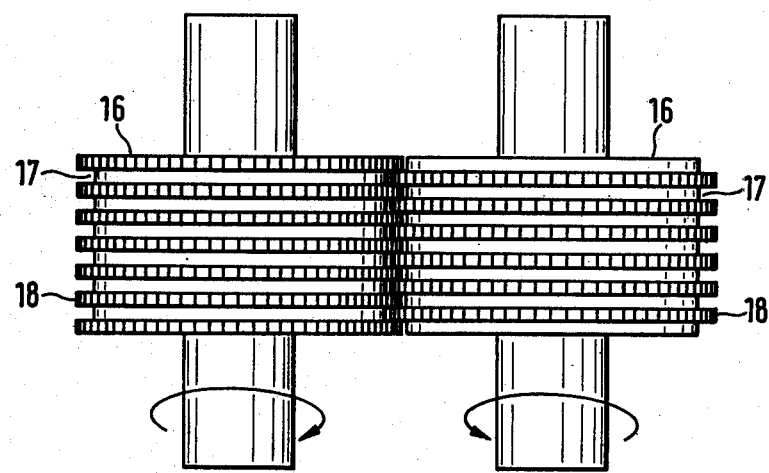
Figure 4D:
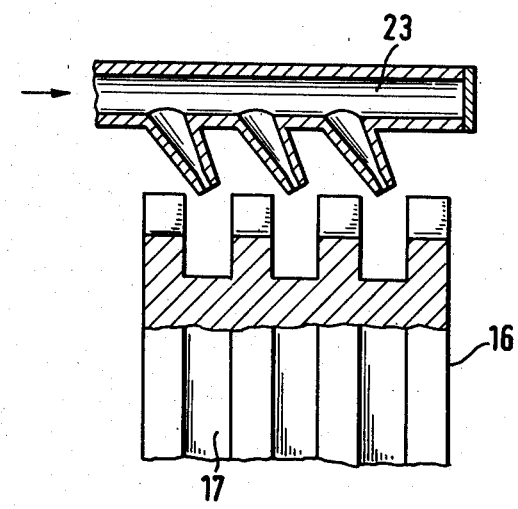
Figure 4E:
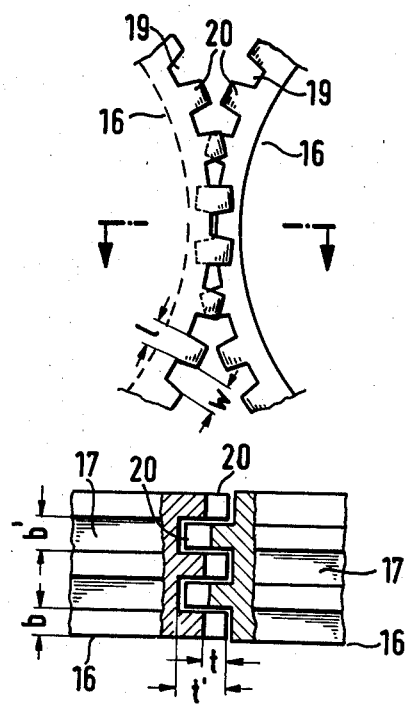

FIGS. 4a to 4g show schematically a per-se well known two-roller press comprising two parallel profiled press rollers 16 adapted for adjustment of different circumferential speeds. If desired, the particles to be ground are preheated in a preheater until their behavior is inelastic. They fall through a funnel-shaped feed chute 15 into the roller nip. Each roller has circumferential grooves 17 shown in the left-hand roller as a dashed line and on the right-hand roller as a solid circular line (FIG. 4b to 4e) of a depth t' and a width b' (FIG. 4e). Webs 18 between the grooves 17 have the width b and are provided with conically, milled recesses 19 having a width w and a depth t. These recesses 19 do not reach as far as the bottom of the circumferential grooves 17 so that t is smaller than t'. Cams 20 of a length 1, a width b, and a height t remain between the recesses 19. The press rollers 16 are disposed so that the webs 18 of one roller is in slipping contact with the bottom surface of the grooves 17 of the opposite roller, so that the tip of a web 18 penetrates closer to the center of the opposing roller than the bottom of the recesses 19. The material to be ground which is charged in the form of particles 2 or films is pressed into several recesses 19 of both press rollers 16 during the intake. Sub-particles 3 are thus formed which fill the grooves entirely or partly. The differential movement of the press rollers 16 broken or torn the connecting lamellae between the sub-particles. To warrant that, the differential path between the overlap must at least have the dimension (w+1). The ejecting devices used may be gear 21 or co-rotating brushes 22 or plungers such as used with gear granulators or roller presses for forming briquettes. The ejection may also be effected by pressurized air or liquid which flows from nozzles 23 arranged laterally (FIG. 4d). With some materials it is sufficient to eject the sub-particles. This method is further promoted by giving the cams a conical shape. The width and the depth of the recesses 19 may be just as large as the width b of the webs 18, i.e. $w=t=b$. It is also possible to provide different dimensions, i.e., $w \neq b$, $t \neq b$, and $w \neq t$, other forms of the recesses are possible as well. The dimensions of the grooves and recesses in a roller, as well as the shapes of the recesses are determined by the size and shape of the particle desired.

Figure 4F:
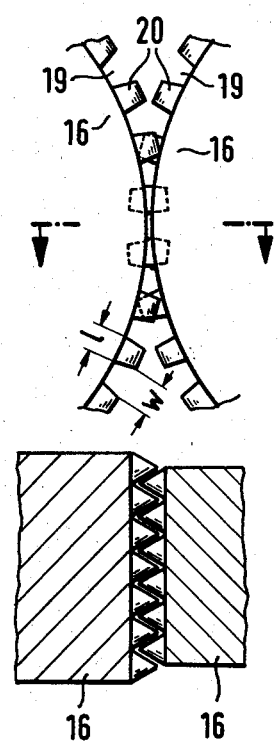
Figure 4G:
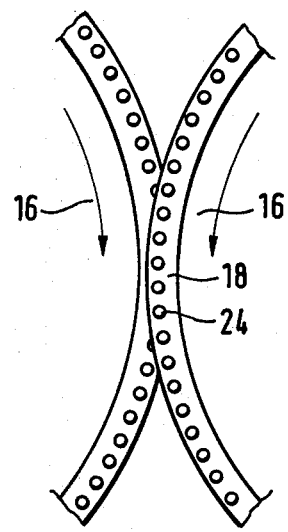

Another design of the profile is shown in FIG. 4f. The grooves and webs are radially conical. If the flanks of the cams are conical, too, the recesses obtain a shape which is favorable for the ejection of the sub-particles. The press roller apparatus may also be operated in such manner that the sub-particles are pressed out laterally during subsequent rotations by the particles of material to be ground which are newly fed into the apparatus. As both rollers rotate at different circumferential speeds, the cams of the other roller cut the emerging sub-particles into parts so that a collective of particles of different size down to one tenth or one twentieth of the size of the recesses is formed. This mode of operation also permits the use of press rollers, the webs 18 of which between the grooves have bores 24 in parallel with the axis (FIG. 4g).

Figure 5A:
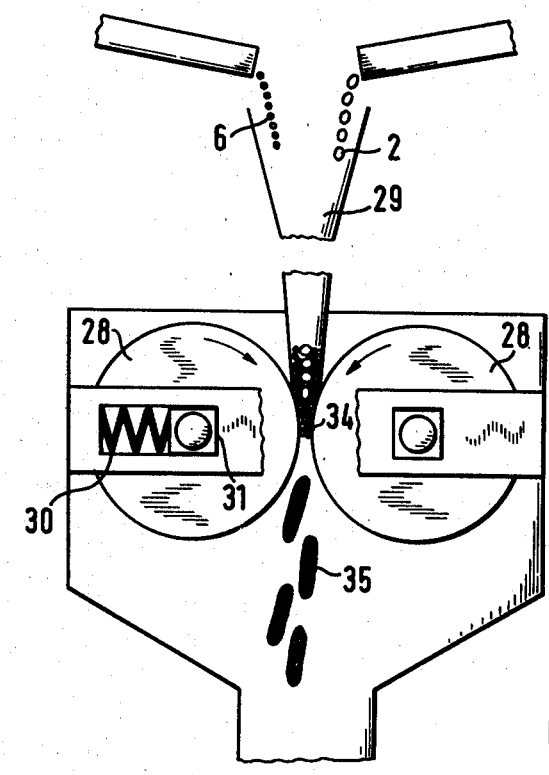
FIG. 5a shows a roller press with smooth rollers for processing mixtures of particles and grinding bodies.

FIG. 5a shows a known two-roller press with which a mixture of material to be ground 2 and grinding balls 6 is pressed between two rotating smooth press rollers 28. The mixture which may be preheated, if desired, in a preheater to a temperature which essentially guarantees an inelastic behavior of the material to be ground, is supplied from above through a chute 29 of corresponding height into the roller nip 34 and enters at a speed which corresponds approximately to the circumferential speed of the roller.

Figure 5B:
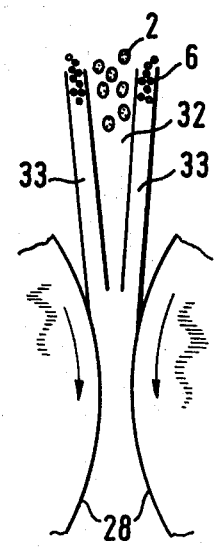
FIG. 5b shows an inner chute for feeding the particles of the materials to be ground and an outer chute for feeding the grinding balls.

One roller is movably arranged and pressed by means of biased springs 30 or hydraulically against a stop 31. The material to be ground and the grinding bodies may either be supplied as a mixture (FIG. 5a) or in layers (FIG. 5b) by feeding the particles 2 of the material to be ground through an inner chute 32 and the grinding balls 6 through an outer chute 33 so that the grinding balls move toward the roller nip at either side of the material to be ground. If the particles of the material to be ground are supplied in the form of films or plates, this divided form of charging the apparatus likewise is useful. In the roller nip 34 the mixture is compacted and the material to be ground is urged into the hollows between the grinding balls 6. The resulting pressed objects 35 appear as a kind of flat bread which must be destroyed subsequently. The flat bread like compact may be broken up by impact loading, which shatters the compact, or by friction, which tears the balls away from one another. The ground material and the grinding balls are separated after the division by means of screening, wind sifting or magnetic separation. It is also possible to apply a combination of separating methods. The size of the cavities between the grinding balls depends on their size and shape. Varying the composition of the size of the grinding balls or their shape makes it possible to adjust a desired particle size distribution of the ground material. Balls having a diameter of 100 $\mu$m permit the production of collectives between 10 $\mu$m and 60 $\mu$m.

The grinding balls may also be replaced by cylindrical sections or irregularly shaped grinding bodies.

Figure 6:
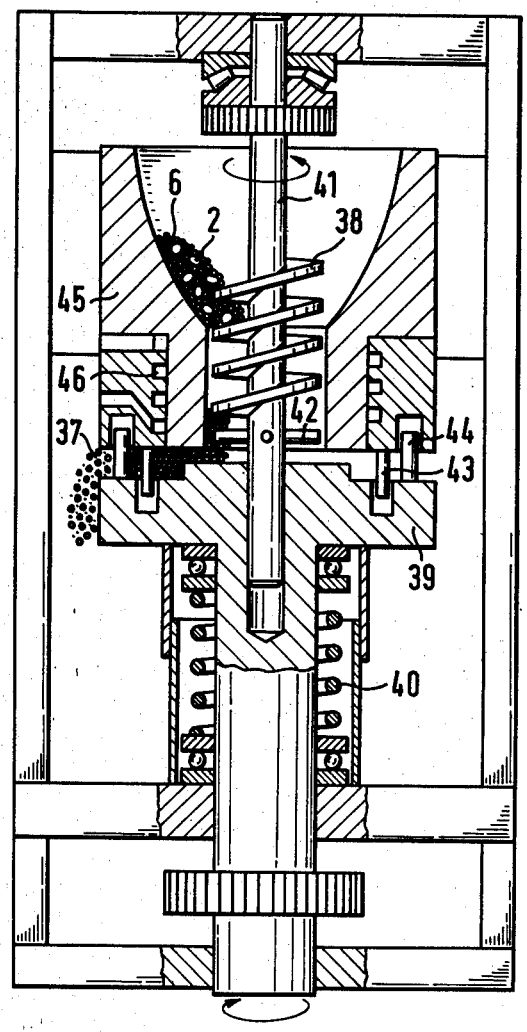
FIG. 6 is a longitudinal sectional view of a screw press.

A mixture of particles 2 of material to be ground and grinding bodies 6 may also be compressed in a screw press, such as shown in FIG. 6. A press screw 38 conveys the mixture against a flexible opposite support 39 which is pressed upwardly in axial direction by means of springs 40. This permits the adjustment of a firmly predetermined maximal pressure in the press chamber. The opposite support 39 yields in a downward direction in response to the feeding performance of the screw and the adjusted pressure so that the mixture of material to be ground and grinding bodies can issue radially through an outlet gap 37. In the press chamber and between the press screw and the outlet gap 37 the shaft 41 of press screw 38 is provided with a shear pin 42 which follows the rotational movement. Any resulting bridges of grinding elements 6 and ground material are destroyed and a relative movement is imparted to the mixture to contribute to the separation of the sub-particles. The opposite support 39 also rotates and is provided at a position further outwardly in the horizontal outlet gap 37 with a ring of shear pins 43. In the vicinity thereof a further ring 44 of shear pins is arranged at the housing 45 of the screw press for meshing engagement with ring 43. The shear pins function to destroy the press cake so as to permit the subsequent separation of ground material and grinding elements. In accordance with the respective requirement the screw press may also be equipped with more than two rings of shear pins. If desired, the housing 45 of the screw press and the abutment 39 are provided with channels 46 for cooling or heating liquids so as to maintain the temperature in the press chamber at the optimum level from the point of view of the processing technique.

In addition to the three presses described for carrying out the method according to the invention others can be developed by means of which the novel grinding method may be realized which has more favorable values as regards the throughputs and power requirement than the methods applied until now.

What is claimed is:

1. A method for fine grinding inelastic materials comprising:
   (a) first urging an inelastic material to be ground, by compression loading into a plurality of adjacent recesses having a size selected in accordance with a degree of fineness desired so as to form subparticles at least some of which will be joined to each other by residual material due to the inelastic nature of the material;
   (b) breaking any residual material connecting the subparticles formed, by movement of the subparticles, relative to each other; and
   (c) removing said subparticles from said recesses.

2. The method of claim 1 wherein said step of urging comprises urging the material to be ground into recesses in the working face of grinding tools, and applying the compression loading.

3. The method of claim 2 further comprising the step of selecting the size of the recesses so that the size of the recesses corresponds to the particle size desired.

4. The method according to claim 1 wherein said step of urging comprises pressing the material to be ground into recesses formed by voids of a bulk of grinding bodies whose rigidity is greater than than of the material to be ground, and wherein said steps of breaking and removing comprise separating said material from the grinding bodies by mechanical means.

5. The method according to claim 1 and further comprising arranging said material to be ground and grinding bodies in layers prior to the step of urging.

6. The method according to claim 5 wherein said step of urging comprises urging said material to be ground into recesses formed by voids of a bulk of grinding bodies of different size, the voids having a volume size distribution which corresponds to the particle size distribution to be obtained.

7. The method according to claim 6 and further including breaking the residual material interconnecting the subparticles of the ground material by compression and shear loading the mixture in the form of a compact of grinding bodies and ground material.

8. Apparatus for fine grinding inelastic materials comprising:
(a) means for urging an inelastic material to be grounded by compression loading into a plurality of adjacent, recesses having a size in the range of about 10 µm to 2 mm selected in accordance with a degree of fineness to be obtained so as to form subparticles at least some of which will be joined by residual material due to the inelastic nature of the material to be ground;
(b) means for breaking away any residual material connecting the subparticles formed by relative movement of the subparticles to each other; and
(c) means for removing said subparticles from said recesses.

9. The apparatus of claim 8 wherein said means for compression loading comprise a two roller press, the working surface of at least one roller thereof having recesses, the size of which corresponds to the subparticles to be obtained.

10. The apparatus according to claim 9 wherein said recesses have a size distribution which corresponds to the size distribution of the ground material to be obtained.

11. The apparatus according to claim 9 wherein the working surfaces of said rollers are provided with intermeshing cams and grooves.

12. The apparatus according to claim 9 wherein the working surface comprises a plurality of cams and grooves, at least the cams being shaped so as to form recesses therebetween which have an outward conical taper.

13. The apparatus of claim 8 wherein said means for compression loading comprise a two roller press with at least one roller having a working surface provided with recesses having a size which is a multiple of the desired size of the subparticles, whereby said roller can be utilized for making a compact in which the material to be ground is pressed into the voids of a bulk of grinding bodies whose rigidity is greater than that of the material to be ground and further including the means to feed grinding bodies whose rigidity is greater than that of the material to be ground together with the material to be ground into the nip formed between the two rollers of said two roller press.

14. The apparatus according to claim 9 or 13 wherein said means for breaking any residual material comprise means for driving the rollers at different circumferential speeds.

15. The apparatus according to claim 9 or 13 wherein said means for removing comprise means cooperating with said rollers to eject the material urged into the recesses.

16. The apparatus according to claim 15 wherein said ejecting means comprise co-rotating brushes engaging the rollers.

17. The apparatus according to claim 15 wherein said ejecting means comprise gears with two surfaces engaging in said recesses.

18. The apparatus according to claim 9 wherein said ejecting means comprise jet nozzles for directing a pressurized fluid into said recesses.

19. Apparatus according to claim 9 and further including a chute for supplying said material to be ground disposed above the rollers.

20. Apparatus according to claim 8 wherein said means for urging comprise a worm press with a press screw having an abutment opposed to the press screw which is resiliently supported.

21. Apparatus according to claim 20 wherein said means for breaking comprise projecting members at the outlet gap of said press screw.

22. The apparatus according to claim 21 wherein said projecting members comprise radially projecting shear pins on the screw shaft on the side of the press screw facing its outlet gap.

23. Apparatus according to claim 8 wherein said means for urging comprises a press plunger and an opposed plunger and wherein said opposed plunger is rotatable and provided with shear pins projecting into the press chamber, said shear pins forming said means for breaking any residual material.

24. Apparatus according to claim 8 wherein said recesses are formed by voids of a bulk of grinding bodies whose rigidity is greater than that of the material to be ground.

25. Apparatus according to claim 13 wherein said means for feeding comprise a double chute disposed above the rollers including an inner chute for the material to be ground and at least one outer chute for grinding bodies.

* * * * *

UNITED STATES PATENT AND TRADEMARK OFFICE
CERTIFICATE OF CORRECTION

PATENT NO. : 4,359,193
DATED : November 16, 1982
INVENTOR(S) : Klaus Schonert

It is certified that error appears in the above—identified patent and that said Letters Patent is hereby corrected as shown below:

Column 2, line 37, change "2 µm" to --2 mm--.

Column 8, line 64, change "corresponds" to --correspond--.

Column 8, line 64, change "size" to --sizes--.

Column 9, line 9, change "of" to --between--.

Signed and Sealed this

Tenth Day of May 1983

[SEAL]

Attest:

GERALD J. MOSSINGHOFF

Attesting Officer   Commissioner of Patents and Trademarks